UNITED STATES PATENT OFFICE.

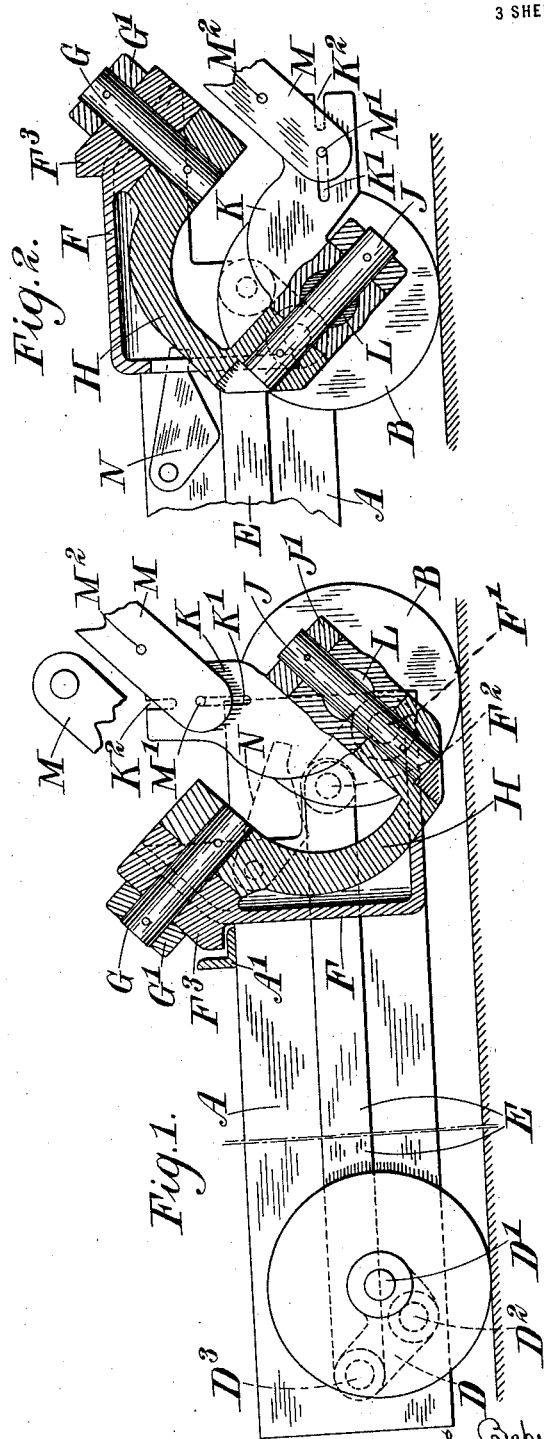

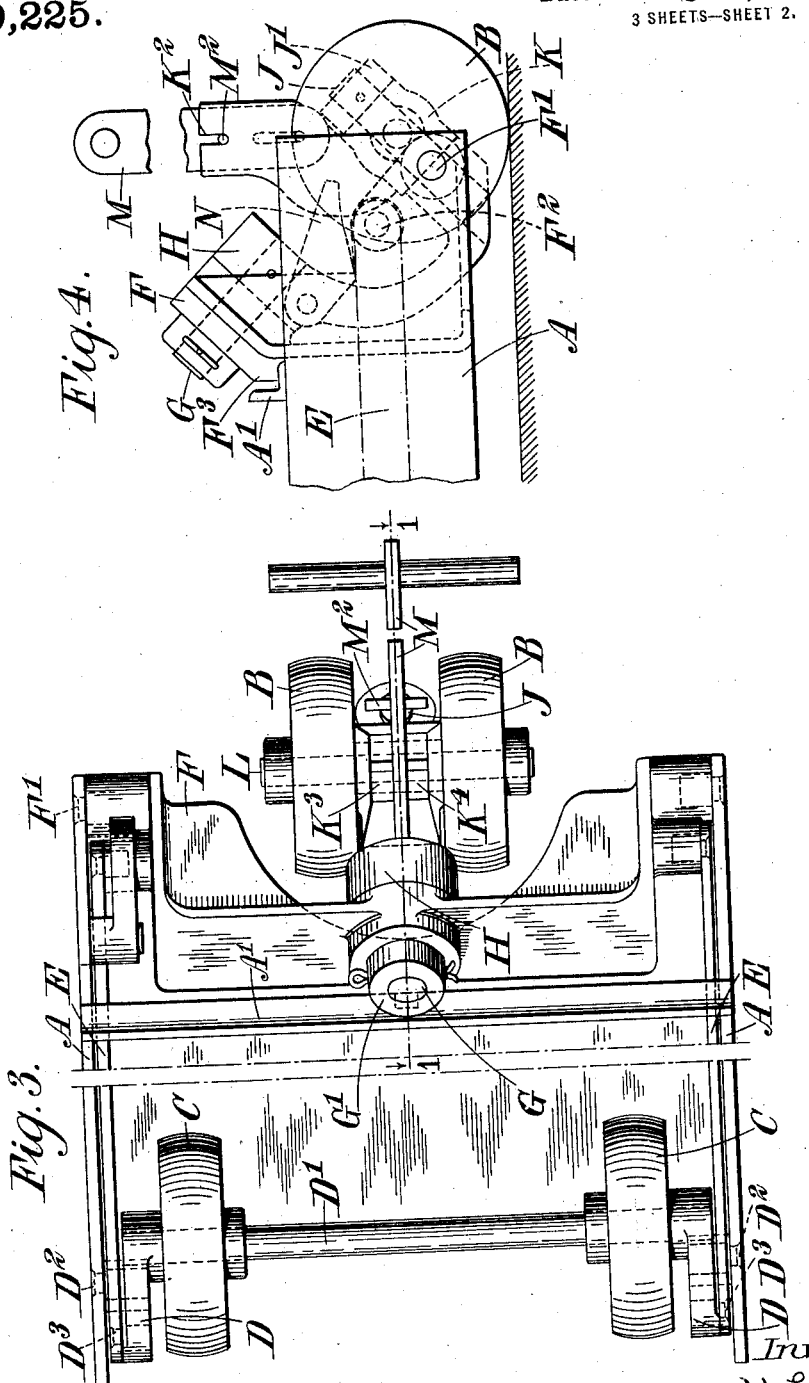

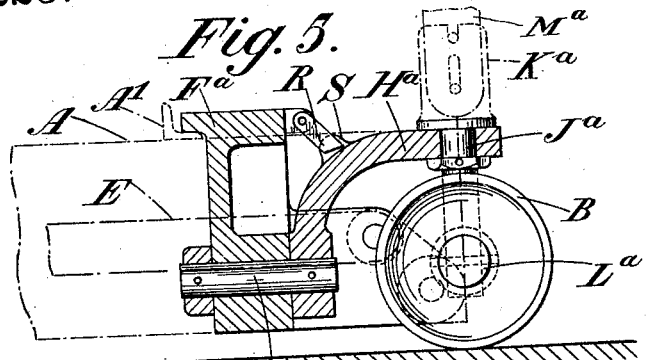
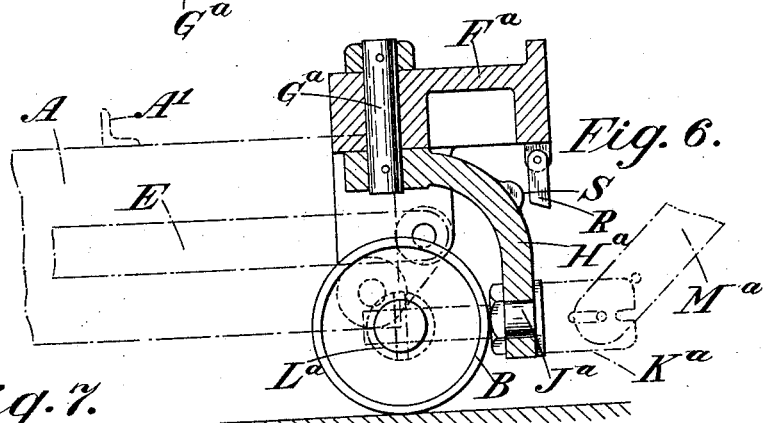
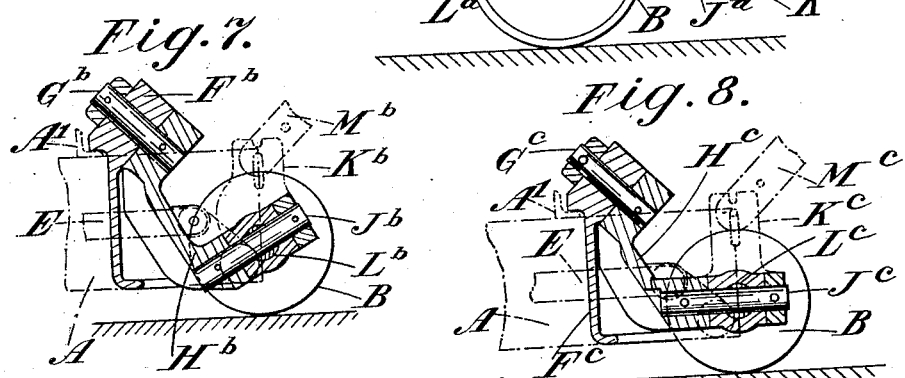
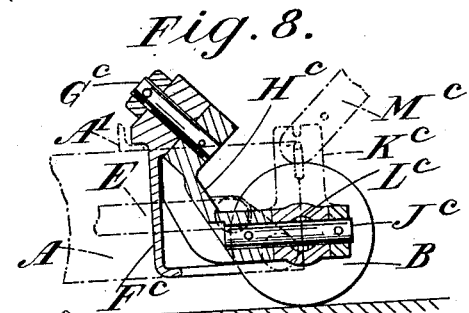
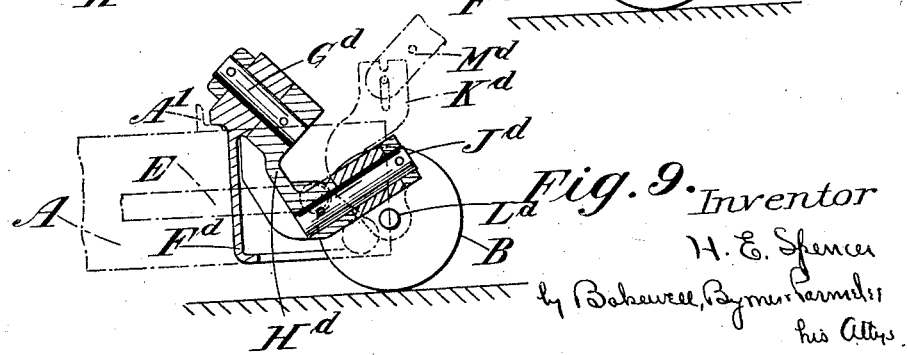

HAROLD EDWIN SPENCER, OF GRAVESEND, ENGLAND, ASSIGNOR TO HESCO LIMITED, OF LONDON, ENGLAND.

LIFTING-TRUCK.

1,389,225.

Specification of Letters Patent. Patented Aug. 30, 1921.

Application filed April 12, 1920. Serial No. 373,355.

*To all whom it may concern:*

Be it known that I, HAROLD EDWIN SPENCER, subject of the King of England, residing at Gravesend, in the county of Kent, England, have invented certain new and useful Improvements in Lifting-Trucks, of which the following is a specification.

This invention is for improvements in or relating to lifting-trucks; that is to say to trucks whereof one part can be raised and lowered relatively to the ground in order to permit the truck to be run under a load, the movable part of the truck raised to lift the load clear of the ground, and the load then transported on the truck in such raised position. Subsequently by lowering the movable part of the truck the load can be deposited on the ground again and the truck drawn out from under it.

In one type of lifting-truck the steered wheel axle, which is controlled by the draft handle, turns about a vertical axis to steer the truck in a horizontal plane and is coupled to the lifting-mechanism of the truck. The present invention has for one of its objects to provide a construction of lifting-truck of this type which can be steered efficiently in both its raised and lowered positions.

Other objects of the invention are to provide a truck which can be readily and cheaply manufactured, which shall contain but few working parts, which shall be simple to control and operate, and which shall be reliable and efficient in use.

The primary feature of the present invention consists in the employment, as a coupling between the lifting mechanism and the steered wheel axle in a lifting-truck of the type just described, of a Hooke's joint or a modification thereof which moves with the said mechanism in the lifting operation, is oscillatable relatively thereto, and is constituted by two elements which have three axes of oscillation transverse to one another, intersecting or not intersecting at a point in the said vertical axis, the two elements being firstly a pivot in the lifting mechanism and having its axis of oscillation therein about which it can oscillate in relation to that mechanism, and secondly a member which is (*a*) connected to said pivot and can oscillate in relation thereto about a second axis *i. e.* the axis of such connection, said axis being arranged transversely to the pivot axis, but not necessarily at a right-angle thereto, and is (*b*) jointed to the wheels by a joint providing the third axis of oscillation *i. e.* an axis which is perpendicular to the second axis aforesaid and may be coincident with or parallel to the axis of the wheel axle. The said coupling between the lifting mechanism and the steered wheel axle enables the latter to turn about the aforesaid vertical axis for steering purposes in whatever positions the Hooke's joint moves into in company with the lifting mechanism.

For a more complete understanding of the invention there will now be described, by way of example only, certain constructional forms of lifting-truck according to the invention. It is to be understood, however, that the invention is not limited to the precise constructional details enumerated.

In the drawings:—

Figure 1 is a side elevation of the truck, partly in section on the line 1—1 Fig. 3, showing the parts in the position which they occupy when the truck is in the lowered position.

Fig. 2 is a sectional view showing certain of the parts in the position which they occupy when the truck is in the raised position.

Fig. 3 is a plan showing the parts in the same position as in Fig. 1.

Fig. 4 is a corresponding partial side elevation.

Fig. 5 is a sectional view somewhat similar to a portion of Fig. 1 showing a modified construction with the parts in the position which they occupy when the truck is in the lowered position;

Fig. 6 is a view similar to Fig. 5 but showing the parts in the position which they occupy when the truck is in the raised position;

Fig. 7 is a sectional view on a smaller scale showing another modification with the parts in the position which they occupy when the truck is in the lowered position;

Fig. 8 is a view similar to Fig. 7 of a further modification, and

Fig. 9 is a similar view of another modification.

Like letters of reference indicate like parts throughout the drawings.

Referring firstly to Figs. 1–4, the truck illustrated comprises a frame A of any suitable construction supported upon two pairs of wheels B and C of which the pair B are steering wheels. The frame A is not mounted directly upon the axles of these wheels, but is supported thereon at the rear by bell-crank levers D, one at each side of the truck, and at the front by a member comprising several elements pivoted together. The bell-crank levers D are each mounted on the axle $D^1$ of the wheels C and at $D^2$ upon the frame A. At $D^3$ they are each connected to a bar E running along each side of the truck.

At the forward end of the truck there is provided a cross-member F which is pivoted in the frame at each side at a point $F^1$ and is connected to each bar E at a point $F^2$. The member F has mounted thereon, in the center line of the truck, upon an oblique pivot G an element H, which is kept in place by a nut or washer $G^1$. This element H carries another oblique pivot J which, in this construction, is at right-angles to the pivot G but lies in the plane thereof and upon this pivot J is mounted a steering head K and the axle L of the steering wheels B. The steering head K and axle L are kept in place on the pivot J by a nut or washer $J^1$ and will move together about the pivot. It will be seen that the pivots G and J and the members working thereon constitute a universal joint of the Hooke type, and further that, in this construction, the axes of these pivots both intersect the axis of the axle L at a point common to them both. This particular arrangement of the pivots G and J relatively to each other, and to the axle L, while advantageous for some constructions of truck, is not essential and may be modified, as will be hereinafter described.

The steering head K is provided with two slots $K^1$ and $K^2$, and has mounted between its two cheeks $K^3$ and $K^4$ the draft handle M of the truck. The handle M is provided with two cross-pins $M^1$ and $M^2$, whereof the former passes through the slot $K^1$ and retains the end of the draft handle in position in the steering head. This pin $M^1$ transmits the draft effort to the truck from the handle. The other pin $M^2$ can, by suitable movement of the handle M, be brought into the slot $K^2$ for the purpose of raising or lowering the frame in the manner hereinafter described. This pin and slot connection between the handle and the truck is not novel and does not *per se* form part of the present invention.

When the frame is in its lowered position, namely, as illustrated in Fig. 1, the cross member F will rest with its lug $F^3$ in contact with a cross-bar $A^1$ on the frame A. To retain the parts in position when the frame is raised a pawl N is provided to engage a suitable part of the member F or a part moving therewith.

Assuming that the frame is in the position illustrated in Fig. 1, to raise it, the handle M would be brought into the position illustrated in Fig. 4, with its pin $M^2$ in engagement with the slot $K^2$. Then by drawing the handle M downward, the steering head K, element H, and cross-member F, would be rotated about the axle L, thereby raising the points $F^1$ and $F^2$ and consequently also the points $D^2$ and $D^3$. The pawl N will then come into operation to prevent undesired return of the parts to the lowered position of the frame after which the handle may be moved into draft position, removing the pin $M^2$ from the slot $K^2$, as illustrated in Fig. 2. The reverse series of operations may be carried out in order to lower the frame.

In the construction described, the full lift of the frame is obtained by moving the draft handle through an angle of 90°. This arrangement is, of course, not essential. With some types of truck the lift may be obtained with much less rotation of the draft handle.

It will be seen that in both positions of the frame the pivots G and J are each at an angle to the vertical and in this construction, this angle is approximately 45°; also that no hindrance is offered to free steering motion of the wheels B in either position of the frame. In both positions deflection of these wheels is allowed for by rotation of the parts about the pivots G, J and L. The steering head K will be under adequate control by the draft handle, for steering purposes, whatever the position of the handle may be.

The draft handle of a lifting-truck has already been used to rotate a coupling member which is connected to the frame of the truck by means including parts similar to the bars E and bell-crank levers D and which operates to raise or lower the frame, but it has not been heretofore proposed to include in such coupling member a universal joint of the Hooke type as just described. The use of a pawl such as N to retain the parts in position with the frame raised is not novel and this pawl may be arranged and operated in any suitable manner, for instance, as described in my United States specification Serial No. 373,356, filed June 1, 1920.

The diagonal arrangement of the pivots illustrated in Figs. 1–4 constitutes a construction of great efficiency which has in particular the advantages of cheapness and of easy steering in both positions of the truck. It is not, however, essential to employ this diagonal arrangement of the pivots, that is to say it is not essential to arrange that neither of them shall come into the horizontal in either of the positions of the truck. As long as two pivots are employed, whereof the axis of one runs transversely, but not necessarily at right angles, to the other, it is possible to allow one of the pivots to come into the horizontal at the raised and the lowered positions of the truck or at either of them and still obtain satisfactory steering.

This form of the invention is illustrated in Figs. 5 and 6. The cross frame $F^a$ is mounted in the truck in the same way as is the frame F in the construction shown in the preceding figures but the pivot $G^a$ is mounted in the cross frame in such a way as to lie horizontal when the truck is in the lowered position. The pivot $J^a$ is at right angles to the pivot $G^a$ and is carried by a member $H^a$ which is substantially the same as the member H of Figs. 1 to 4 but which is placed above instead of below the wheel axle $L^a$ in the lowered position of the truck. In this position in the truck steering will take place about the pivot $J^a$, no oscillation occurring about the pivot $G^a$, but in the raised position of the truck (see Fig. 6) steering will take place about the pivot $G^a$ only, no oscillation occurring about the pivot $J^a$. It will be observed that the axis of the pivot $G^a$ may be placed below the axis of the axle $L^a$ to tend to give stability to the member $H^a$ during steering operations in the lowered position of the truck. If during such steering operations the axle $L^a$ is turned around by the handle $M^a$ so as to be almost parallel to the pivot $G^a$, there will be a tendency for the member $H^a$ to fall sidewise of the truck. The relative positions of the pivot $J^a$ and axle $L^a$ just described will tend to prevent this falling movement, but if desired a positive retaining catch may be employed instead of, or in addition to, such arrangement of the pivots and axle. This may conveniently take the form of a pawl R pivoted upon the cross frame $F^a$ with its end reaching between a pair of ears or lugs S on the member $H^a$. By its own weight, the pawl R will, in the lowered position of the truck, fall between these lugs S and thus positively prevent the aforesaid falling movement of the member $H^a$. When the parts are in the raised position of the truck, however, the pawl R also by its own weight will fall out of engagement with the lugs S (see Fig. 6) and thus will not interfere with steering movement of the parts about the pivot $G^a$. Instead of a pawl as just described other suitable forms of catch may be employed, if desired.

In the constructions of truck described above, the two pivots G and J and $G^a$ and $J^a$ are arranged at an angle of 90° to each other. In Fig. 7 they are shown arranged at an angle of 75°–105°. In other words, when the truck is in lowered position, as shown in Fig. 7 the pivot $G^b$ would be inclined at 45° while the pivot $J^b$ would be at an angle of 30° to the horizontal. With this arrangement of the pivots the steering would take place simultaneously about both pivots in both positions of the truck, assuming that the angle effecting the lift is 90° or some other angle which will leave both pivots still out of the vertical.

In the arrangement shown in Fig. 8, the pivot $G^c$ is inclined at 45° in the lowered position of the truck and the pivot $J^c$ lies horizontal. Steering in this position, therefore, will entail simultaneous oscillation about both of the pivots $G^c$ and $J^c$. With a 90° angle of lift, however, which would bring the pivot $J^c$ into the vertical, steering could, in the raised position of the truck, take place solely about the pivot $J^c$. With this arrangement of the pivots there may be a tendency for the wheels B to be tilted during steering in the lowered position of the truck.

Obviously very many different arrangements of the two pivots are possible in addition to those just described, and it is to be understood that the present invention includes all such arrangements.

For some constructions of truck it is preferable to secure the lift by a rotation through 90° of the pivots about the running axis of the steering wheels. This angle of rotation for lift is, however, not essential. For example for some constructions an angle of 45° is sufficient.

In the constructions shown in Figs. 1 to 4 and 7 and 8 the axes of the pivots G and J, $G^b$ and $J^b$ and $G^c$ and $J^c$ meet on the axis of the steering wheels. Figs. 5 and 6 show a construction in which this is not the case, and a further example is given in Fig. 9. In this construction the axle $L^d$ is carried upon an extension of the steering head $K^d$, below the pivot $J^d$. The steering head $K^d$, of course, is still pivoted upon the pivot $J^d$. Apart from this displacement of the axle $L^d$, the construction shown in Fig. 9 is similar to that shown in Fig. 7, the pivot $G^d$ corresponding to the pivot $G^b$.

The axes of the pivots G and J may meet therefore on the running axis of the steering wheels, or on the vertical axis about which the steering takes place, or may meet elsewhere than on either of these axes.

In the constructions described in Figs. 1 to 4 and 7 to 9 the steering handle M, $M^b$, $M^c$, $M^d$ is attached to a steering head K, $K^b$, $K^c$, $K^d$, respectively, mounted about the axle L, $L^b$, $L^c$, $L^d$. This arrangement, however, is not essential since in some circumstances the steering handle could be attached to one or other of the pivots (as in Figs. 5 and 6).

It will be appreciated that each of the constructions described above employs as a coupling between the cross frame F, $F^a$, $F^b$, $F^c$, $F^d$ and the steered wheel axle L, $L^a$, $L^b$, $L^c$, $L^d$, a Hooke's joint or a modification thereof which moves with the cross frame in the lifting operation, is oscillatable relatively thereto and is constituted by two elements which have three axes of oscillation transverse to one another. These two elements are firstly the pivot G, $G^a$, $G^b$, $G^c$, $G^d$, in the cross frame, and secondly the member KL, $K^aL^a$, $K^bL^b$, $K^cL^c$, $K^dL^d$, which is connected to the pivot G, $G^a$, $G^b$, $G^c$, $G^d$ by the composite member HJ, $H^a$ $J^a$, $H^bJ^b$, $H^cJ^c$, $H^dJ^d$, and can oscillate in relation thereto about the pivot J, $J^a$, $J^b$, $J^c$, $J^d$, and is jointed to the steered wheel B. The term "Hooke's joint or a modification thereof" has been employed in order to include constructions wherein because of the relative arrangement of the axes, the joint departs somewhat from the general appearance of the common Hooke's universal joint.

The vertical axis about which the steered wheel axle L, $L^a$, $L^b$, $L^c$, $L^d$ turns to steer the truck in a horizontal plane may be either virtual or actual. In the construction illustrated in Figs. 5 and 6 it is an actual axis coinciding alternately with the axis of the pivots $G^a$ and $J^a$. In the other constructions, however, it is a virtual vertical axis; that is to say movement about the axis takes place as the result of a compound movement about more than one pivot.

It will be understood that the invention is applicable to trucks of the single main frame type, or the two frame type and to trucks embodying any means of lifting whether by bell-cranks, slides, links, cams or other mechanism; for example the movable part of the frame of the truck may slide up an inclined surface when it is raised, being pulled up this surface due to the movement of an operating member about the running axis of the steering wheels.

The invention is not limited to the precise details of construction hereinbefore described, since these may be modified without departing from the spirit and scope of the invention.

What I claim as my invention and desire to secure by Letters Patent is:—

1. A lifting-truck comprising two truck parts, lifting mechanism for moving one part relatively to the other to raise and lower the truck, a steered wheel axle mounted to turn about a vertical axis to steer the truck in a horizontal plane, and a coupling between the lifting mechanism and the steered wheel axle which moves with the lifting mechanism in the lifting operation, is oscillatable relatively thereto, and is constituted by two elements which have three axes of oscillation transverse to one another, the two elements being firstly a pivot in the lifting mechanism and having its axis of oscillation therein about which it can oscillate in relation to that mechanism, and secondly a member which is (a) connected to said pivot and can oscillate in relation thereto about a second axis i. e. the axis of such connection, said axis being arranged transversely to the pivot axis, and is (b) jointed to the truck wheels by a joint providing the third axis of oscillation i. e. an axis which is perpendicular to the second axis aforesaid.

2. A lifting-truck comprising two truck parts, lifting mechanism for moving one part relatively to the other to raise and lower the truck, a steered wheel axle mounted to turn about a vertical axis to steer the truck in a horizontal plane, and a coupling between the lifting mechanism and the steered wheel axle which moves with the lifting mechanism in the lifting operation, is oscillatable relatively thereto, and is constituted by two elements which have three axes of oscillation transverse to one another, the two elements being firstly a pivot in the lifting mechanism and having its axis of oscillation therein about which it can oscillate in relation to that mechanism, and secondly a member which is (a) connected to said pivot and can oscillate in relation thereto about a second axis i. e. the axis of such connection, said axis being arranged transversely to the pivot axis, and is (b) jointed to the truck wheels by a joint providing the third axis of oscillation i. e. an axis which is perpendicular to the second axis aforesaid, and is coincident with the axis of the wheel axle.

3. A lifting truck comprising two truck parts, lifting mechanism for moving one part relatively to the other to raise and lower the truck, a steered wheel axle mounted to turn about a vertical axis to steer the truck in a horizontal plane, a coupling between the lifting mechanism and the steered wheel axle which moves with the lifting mechanism in the lifting operation, is oscillatable relatively thereto, and is constituted by two elements which have three axes of oscillation transverse to one another, the two elements being firstly a pivot in the lifting mechanism and having its axis of oscillation therein about which it can oscillate in relation to that mechanism, and secondly a member which is (a) connected to said pivot and can oscillate in relation thereto about a second axis i. e. the axis of such connection, said axis being arranged transversely to the pivot axis, and is (b) jointed to the truck wheels by a joint providing the third axis of oscillation i. e. an axis which is perpendicular to the second axis aforesaid, and a lever which engages the steered wheel axle to move said axle about the aforesaid vertical axis for steering the truck and which can also be operated to tilt the member aforesaid to actuate the lifting mechanism.

4. A lifting truck comprising two truck parts, lifting mechanism for moving one part relatively to the other to raise and lower the truck, a steered wheel axle mounted to turn about a vertical axis to steer the truck in a horizontal plane, and a coupling between the lifting mechanism and the steered wheel axle which moves with the lifting mechanism in the lifting operation, is oscillatable relatively thereto, and is constituted by two elements which have three axes of oscillation transverse to one another, the two elements being firstly a pivot in the lifting mechanism and having its axis of oscillation therein about which it can oscillate in relation to that mechanism, and secondly a member which is (a) connected to said pivot and can oscillate in relation thereto about a second axis i. e. the axis of such connection, said axis being arranged transversely to the pivot axis, and is (b) jointed to the truck wheels by a joint providing the third axis of oscillation i. e. an axis which is perpendicular to the second axis aforesaid, there being both in the raised and lowered positions of the truck one of the said axes at an angle to the vertical and horizontal.

5. A lifting-truck comprising two truck parts, lifting mechanism for moving one part relatively to the other to raise and lower the truck, a steered wheel axle mounted to turn about a vertical axis to steer the truck in a horizontal plane, and a coupling between the lifting mechanism and the steered wheel axle which moves with the lifting mechanism in the lifting operation, is oscillatable relatively thereto, and is constituted by two elements which have three axes of oscillation transverse to one another, the two elements being firstly a pivot in the lifting mechanism and having its axis of oscillation therein about which it can oscillate in relation to that mechanism, and secondly a member which is (a) connected to said pivot and can oscillate in relation thereto about a second axis i. e. the axis of such connection, said axis being arranged transversely to the pivot axis, and is (b) jointed to the truck wheels by a joint providing the third axis of oscillation i. e. an axis which is perpendicular to the second axis aforesaid, two of said axes being each at an angle to the vertical in both the raised and lowered positions of the truck.

6. A lifting-truck comprising two truck parts, lifting mechanism for moving one part relatively to the other to raise and lower the truck, a steered wheel axle mounted to turn about a vertical axis to steer the truck in a horizontal plane, and a universal joint to couple together the lifting mechanism and the steered wheel axle.

7. A lifting-truck comprising two truck parts, lifting mechanism for moving one part relatively to the other to raise and lower the truck, a steered wheel axle mounted to turn about a vertical axis to steer the truck in a horizontal plane, a universal joint to couple together the lifting mechanism and the steered wheel axle, and a lever which engages the steered wheel axle to move said axle for steering the truck and which can also be operated to tilt a part of the universal joint to actuate the lifting mechanism.

8. A lifting-truck comprising two truck parts, lifting mechanism for moving one part relatively to the other to raise and lower the truck, a steered wheel axle mounted to turn about a vertical axis to steer the truck in a horizontal plane and a universal joint to couple together the lifting mechanism and the steered wheel axle, there being both in the raised and lowered positions of the truck one of the axes of pivoting of the universal joint at an angle to the vertical and horizontal.

9. A lifting-truck comprising two truck parts, lifting mechanism for moving one part relatively to other to raise and lower the truck, a steered wheel axle mounted to turn about a vertical axis to steer the truck in a horizontal plane and a universal joint to couple together the lifting mechanism and the steered wheel axle, two axes of pivoting of the universal joint being each at an angle to the vertical in both the raised and lowered positions of the truck.

10. In a lifting-truck comprising two truck parts, the combination with lifting mechanism for moving one part relatively to the other to raise and lower the truck, and a steered wheel axle mounted to turn about a vertical axis to steer the truck in a horizontal plane, of a coupling between the lifting mechanism and the steered wheel axle comprising the universal joint members and their coöperating parts F, G, H, J and K substantially as and for the purposes set forth.

11. In a lifting truck, the combination of a load-carrying member, two sets of wheels, one of which is a steering set, a member carrying said steering set and having two pivotal axes for steering purpose, means for moving said member around the axis of the steering wheels, a member rotatable around the axis of said other set of wheels, and means connecting said members together and to said load-carrying member, whereby when said members are moved around the axes of said wheels the load-carrying member will be maintained substantially horizontal and elevated or lowered dependent upon the direction of movement of said member.

12. A lifting truck comprising two truck parts, lifting mechanism for moving one part relatively to the other to raise and lower the truck, a steered wheel axle mounted to turn about a vertical axis to steer the truck in a horizontal plane, a coupling between the lifting mechanism and the steered wheel axle which moves with the lifting mechanism in the lifting operation, is oscillatable relatively thereto, and is constituted by two elements which have three axes of oscillation transverse to one another, the two elements being firstly a pivot G in the lifting mechanism and having its axis of oscillaton therein about which it can oscillate in relation to that mechanism, and secondly a composite member KL which is (a) connected to said pivot and can oscillate in relation thereto about a second axis i. e. the axis of such connection, said axis being arranged transversely to the pivot axis and being free toward one end and enveloped toward the other end by the said composite member, and is (b) jointed to the truck wheels by a joint providing the three axes of oscillation, i. e. an axis which is perpendicular to the second axis aforesaid, a connecting member H extending between the free end of said second axis and the pivot, and a lever which engages the composite member KL to move the steered wheel axle about the aforesaid vertical axis for steering the truck and which can also be operated to tilt the composite member aforesaid to actuate the lifting mechanism.

In testimony whereof I affix my signature.

HAROLD EDWIN SPENCER.